United States Patent
Harmes, V et al.

(10) Patent No.: US 10,696,192 B2
(45) Date of Patent: Jun. 30, 2020

(54) CHILD SAFETY SEAT

(71) Applicant: Wonderland Switzerland AG, Steinhausen (CH)

(72) Inventors: Clyde S. Harmes, V, Mohnton, PA (US); James M. F. Hutchinson, Mohnton, PA (US)

(73) Assignee: Wonderland Switzerland AG, Steinhausen (CH)

( * ) Notice: Subject to any disclaimer, the term of this patent is extended or adjusted under 35 U.S.C. 154(b) by 42 days.

(21) Appl. No.: 16/018,375

(22) Filed: Jun. 26, 2018

(65) Prior Publication Data

US 2018/0370392 A1    Dec. 27, 2018

Related U.S. Application Data

(60) Provisional application No. 62/525,248, filed on Jun. 27, 2017.

(51) Int. Cl.
*B60N 2/28*    (2006.01)

(52) U.S. Cl.
CPC ........... *B60N 2/2806* (2013.01); *B60N 2/286* (2013.01); *B60N 2/2821* (2013.01);
(Continued)

(58) Field of Classification Search
CPC .... B60N 2/2806; B60N 2/286; B60N 2/2863; B60N 2/2812
(Continued)

(56) References Cited

U.S. PATENT DOCUMENTS 5,611,596 A * 3/1997 Barley ................. B60N 2/2806
297/256.13
5,839,789 A * 11/1998 Koledin ............... B60N 2/2806
297/476
(Continued)

FOREIGN PATENT DOCUMENTS

CA    2945466 A1    10/2016
CN    205468637 U    8/2016
(Continued)

OTHER PUBLICATIONS

Nov. 18, 2018 Extended Search Report from co-pending EP Patent Application No. 18180085.5.
(Continued)

*Primary Examiner* — Mark R Wendell
(74) *Attorney, Agent, or Firm* — NZ Carr Law Office PLLC

(57) ABSTRACT

A child safety seat includes a seat shell adapted to receive a child, a belt tightener and a latching mechanism. The seat shell defines a first and a second belt path, the first belt path being configured to receive an anchoring belt for attaching the child safety seat in a forward facing position on a vehicle seat, and the second belt path being configured to receive an anchoring belt for attaching the child safety seat in a rearward facing position on a vehicle seat. The belt tightener is pivotally connected with the seat shell, and is adjustable between a first position for clamping an anchoring belt disposed along the first belt path, and a second position for clamping an anchoring belt disposed along the second belt path. The latching mechanism is operable to lock the belt tightener in the first and second positions.

19 Claims, 8 Drawing Sheets

(52) U.S. Cl.
CPC ......... *B60N 2/2851* (2013.01); *B60N 2/2863* (2013.01); *B60N 2/2872* (2013.01)

(58) Field of Classification Search
USPC ............................ 297/250.1, 256.14, 256.16
See application file for complete search history.

(56) References Cited

U.S. PATENT DOCUMENTS

| | | | | |
|---|---|---|---|---|
| 5,915,787 | A * | 6/1999 | Brookman | B60N 2/2806 297/256.13 |
| 6,220,662 | B1 * | 4/2001 | Franco-Vila | B60N 2/2806 297/256.13 |
| 6,672,664 | B2 * | 1/2004 | Yanaka | B60N 2/2806 24/134 KB |
| 6,764,135 | B2 * | 7/2004 | Sasaki | B60N 2/2806 297/250.1 |
| 7,029,068 | B2 * | 4/2006 | Yoshida | B60N 2/2806 297/250.1 |
| 7,163,265 | B2 * | 1/2007 | Adachi | B60N 2/2806 297/250.1 |
| 7,300,113 | B2 * | 11/2007 | Baloga | B60N 2/2803 297/250.1 |
| 7,901,003 | B2 * | 3/2011 | Meeker | B60N 2/2806 297/250.1 |
| 8,444,222 | B2 * | 5/2013 | Buckingham | B60N 2/2887 297/253 |
| 9,162,593 | B2 * | 10/2015 | Spence | B60N 2/265 |
| 10,189,381 | B2 * | 1/2019 | Williams | B60N 2/265 |
| 10,259,356 | B2 * | 4/2019 | Lehman | B60N 2/28 |
| 10,266,077 | B2 * | 4/2019 | Mason | B60N 2/2812 |
| 10,300,814 | B2 * | 5/2019 | Williams | B60N 2/2824 |
| 2001/0004163 | A1 * | 6/2001 | Yamazaki | B60N 2/2806 297/256.16 |
| 2007/0228788 | A1 * | 10/2007 | Meeker | B60N 2/2806 297/250.1 |
| 2011/0140491 | A1 * | 6/2011 | Williams | B60N 2/2806 297/256.16 |
| 2011/0272983 | A1 * | 11/2011 | Fritz | B60N 2/2806 297/250.1 |
| 2014/0062150 | A1 * | 3/2014 | Strong | B60N 2/2824 297/250.1 |
| 2015/0115676 | A1 * | 4/2015 | Strong | B60N 2/2806 297/250.1 |
| 2015/0183341 | A1 * | 7/2015 | Carpenter | B60N 2/2821 297/256.16 |
| 2016/0207497 | A1 * | 7/2016 | Seal | B60R 22/105 |
| 2016/0311345 | A1 * | 10/2016 | Morgenstern | B60N 2/2806 |
| 2017/0106772 | A1 | 4/2017 | Williams et al. | |
| 2019/0217751 | A1 * | 7/2019 | Kaiser | B60N 2/2824 |

FOREIGN PATENT DOCUMENTS

| | | |
|---|---|---|
| EP | 1199213 A1 | 4/2002 |
| JP | 2002-036924 | 2/2002 |

OTHER PUBLICATIONS

English translation of Office Action of the corresponding JP Patent Application No. 2018-120914 dated Jun. 18, 2019.

* cited by examiner

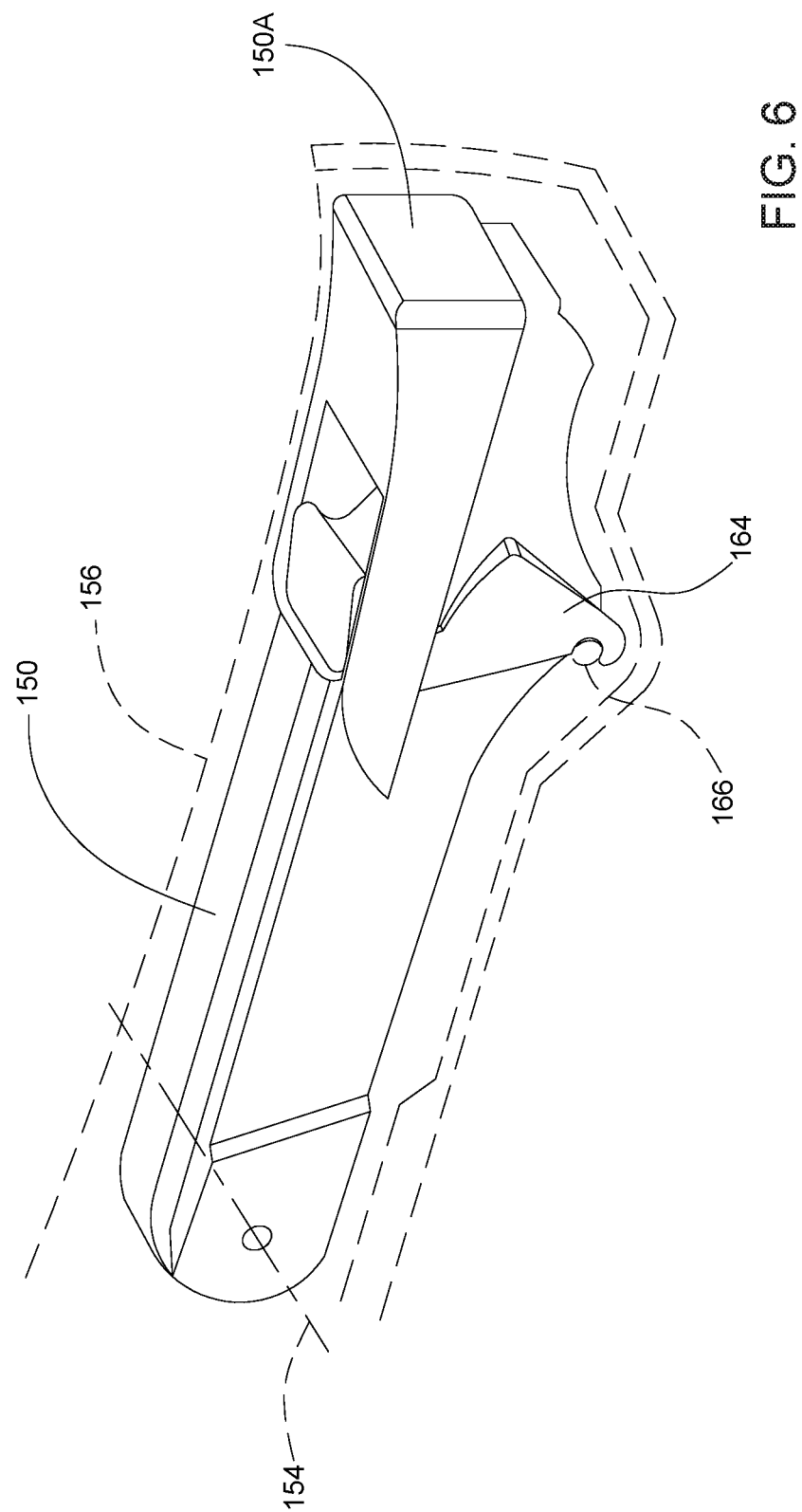

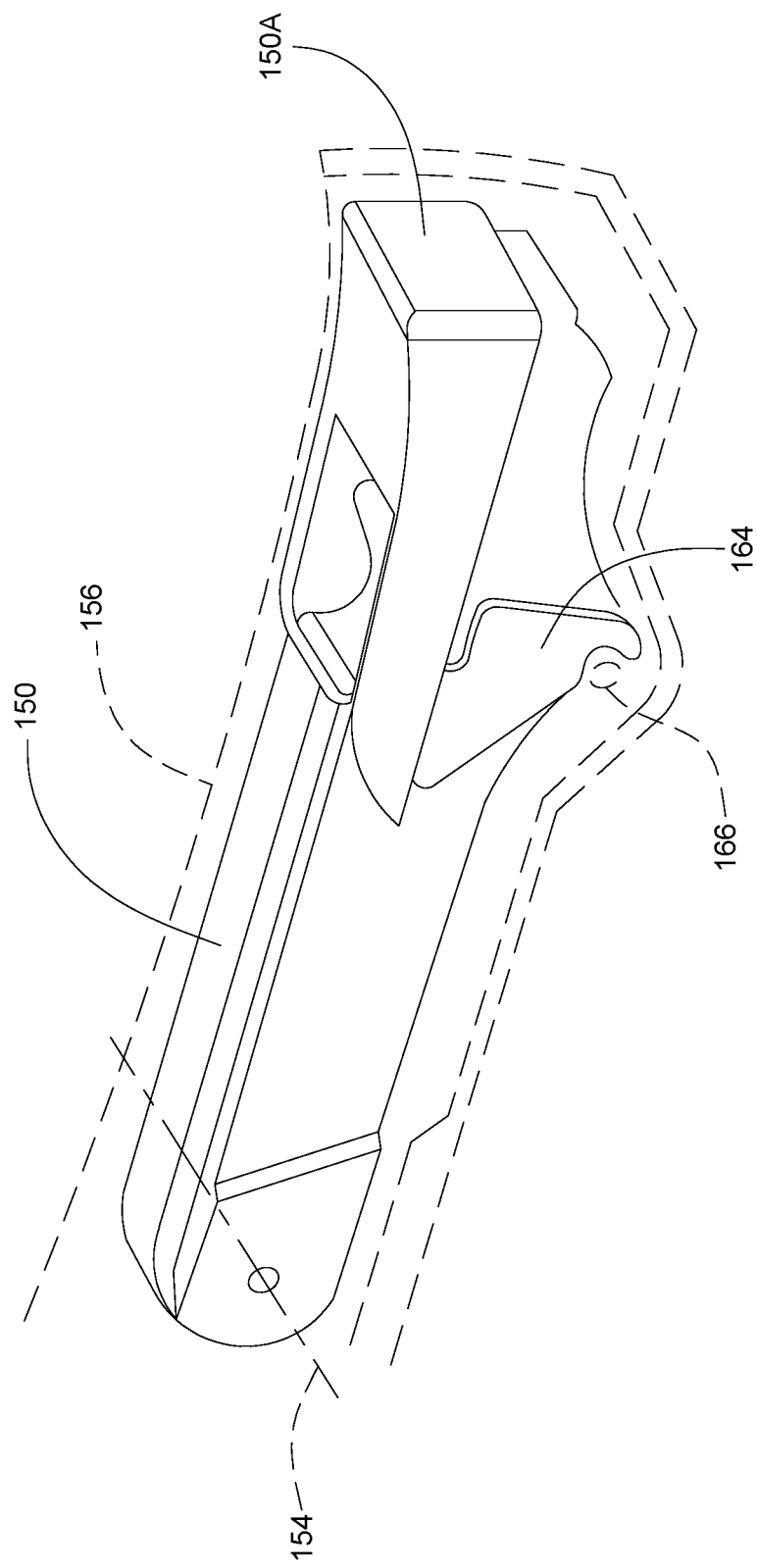

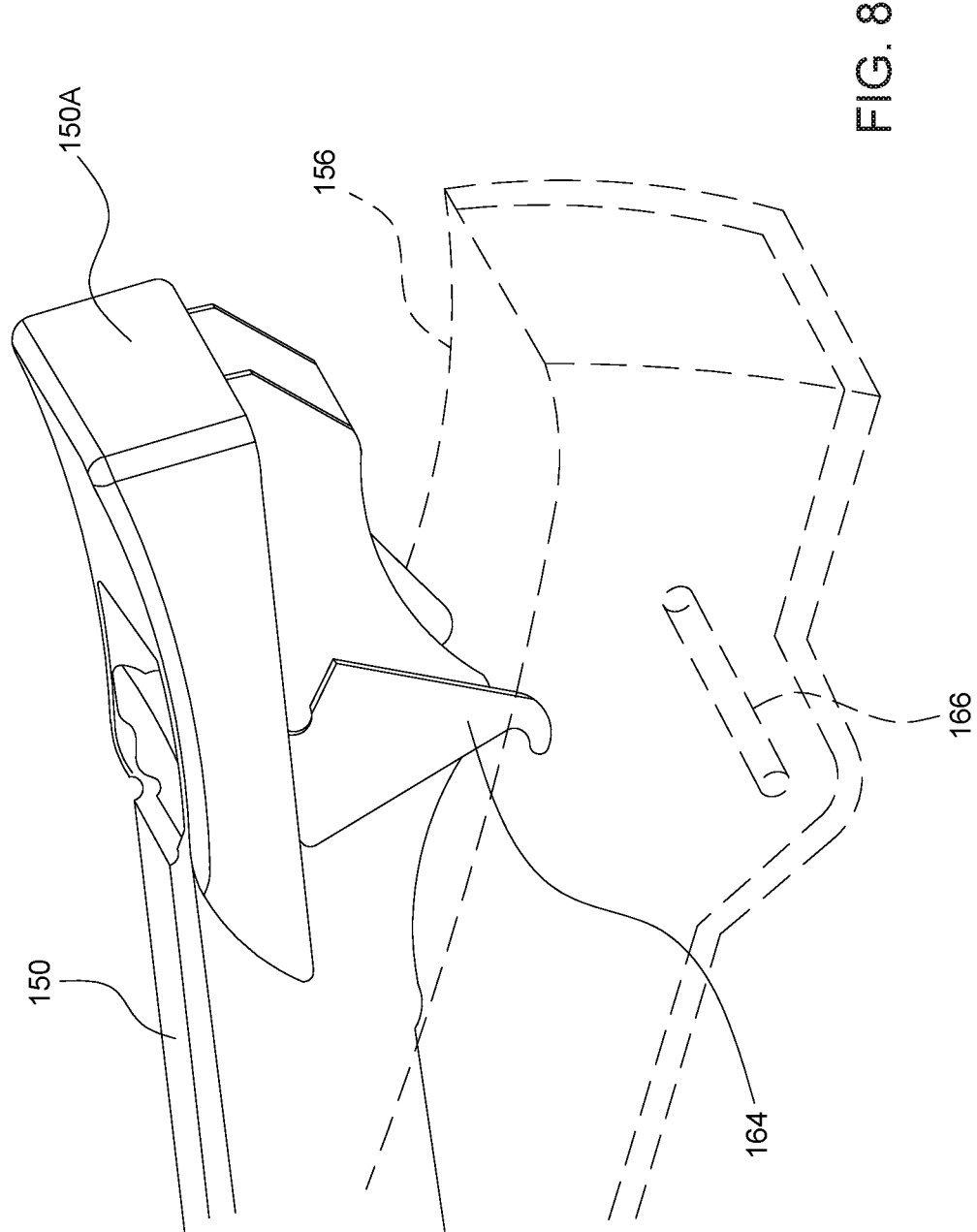

CHILD SAFETY SEAT

CROSS-REFERENCE TO RELATED APPLICATION(S)

This application claims priority to U.S. Provisional Patent Application No. 62/525,248 filed on Jun. 27, 2017, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers usually recommend to seat children in a vehicle in a rear facing configuration until the age of 2 years old. As the child grows older, the child safety seat then may be installed in a forward facing configuration.

The installation of the child safety seat usually requires securely attaching the child safety seat on the vehicle seat with a vehicle seatbelt or a harness separately provided. This can be so difficult to achieve with certain child safety seats that a caregiver may need to climb into the vehicle and press down on the child safety seat while pulling on the vehicle seatbelt.

Therefore, there is a need for an improved child safety seat that allows convenient attachment on a vehicle seat with minimal effort, and can address at least the foregoing issues.

SUMMARY

The present application describes a child safety seat that is easy to operate and can provide proper tension in an anchoring belt for securely attaching the child safety seat on a vehicle seat in a rearward and forward facing configuration. According to one aspect, the child safety seat includes a seat shell adapted to receive a child, a belt tightener and a latching mechanism. The seat shell defines a first and a second belt path, the first belt path being configured to receive an anchor belt for attaching the child safety seat in a forward facing position on a vehicle seat, and the second belt path being configured to receive an anchor belt for attaching the child safety seat in a rearward facing position on a vehicle seat. The belt tightener is pivotally connected with the seat shell, and is adjustable between a first position for tightening an anchor belt disposed along the first belt path, and a second position for tightening an anchor belt disposed along the second belt path. The latching mechanism is operable to lock the belt tightener in the first and second positions.

According to another aspect, the child safety seat includes a seat shell adapted to receive a child, a belt tightener and a latching mechanism. The seat shell has a first and a second cavity portion distinct from each other. The belt tightener is pivotally connected with the seat shell and has a pressing portion adapted to push an anchor belt in any of the first and second cavity portions. The belt tightener has a first position where the pressing portion is at least partially received in the first cavity portion for tightening an anchor belt disposed along a first belt path, and a second position where the pressing portion is at least partially received in the second cavity portion for tightening an anchor belt disposed along a second belt path. The latching mechanism is operable to lock the belt tightener in the first and second positions.

According to yet another aspect, the child safety seat includes a seat shell adapted to receive a child, and a first and a second belt tightener. The seat shell has a central axis and two sidewalls respectively located at a left and a right side of the seat shell. The first and second belt tighteners are respectively connected pivotally with the seat shell, and are disposed in an inner region of the seat shell between the two sidewalls and offset from the central axis. The first belt tightener is operable to clamp an anchor belt disposed along a first belt path for attaching the child safety seat in a forward facing position on a vehicle seat, and the second belt tightener is operable to clamp an anchor belt disposed along a second belt path for attaching the child safety seat in a rearward facing position on a vehicle seat.

BRIEF DESCRIPTION OF THE DRAWINGS

FIG. 6 is a schematic view illustrating the assembly of a latch on one of the two belt tighteners in the child safety seat shown in FIG. 5;

FIG. 7 is a schematic view illustrating the latch shown in FIG. 6 in an unlocking state; and FIG. 8 is a schematic view illustrating the belt tightener shown in FIG. 6 in a release state.

DETAILED DESCRIPTION OF THE EMBODIMENTS

Figure 1:
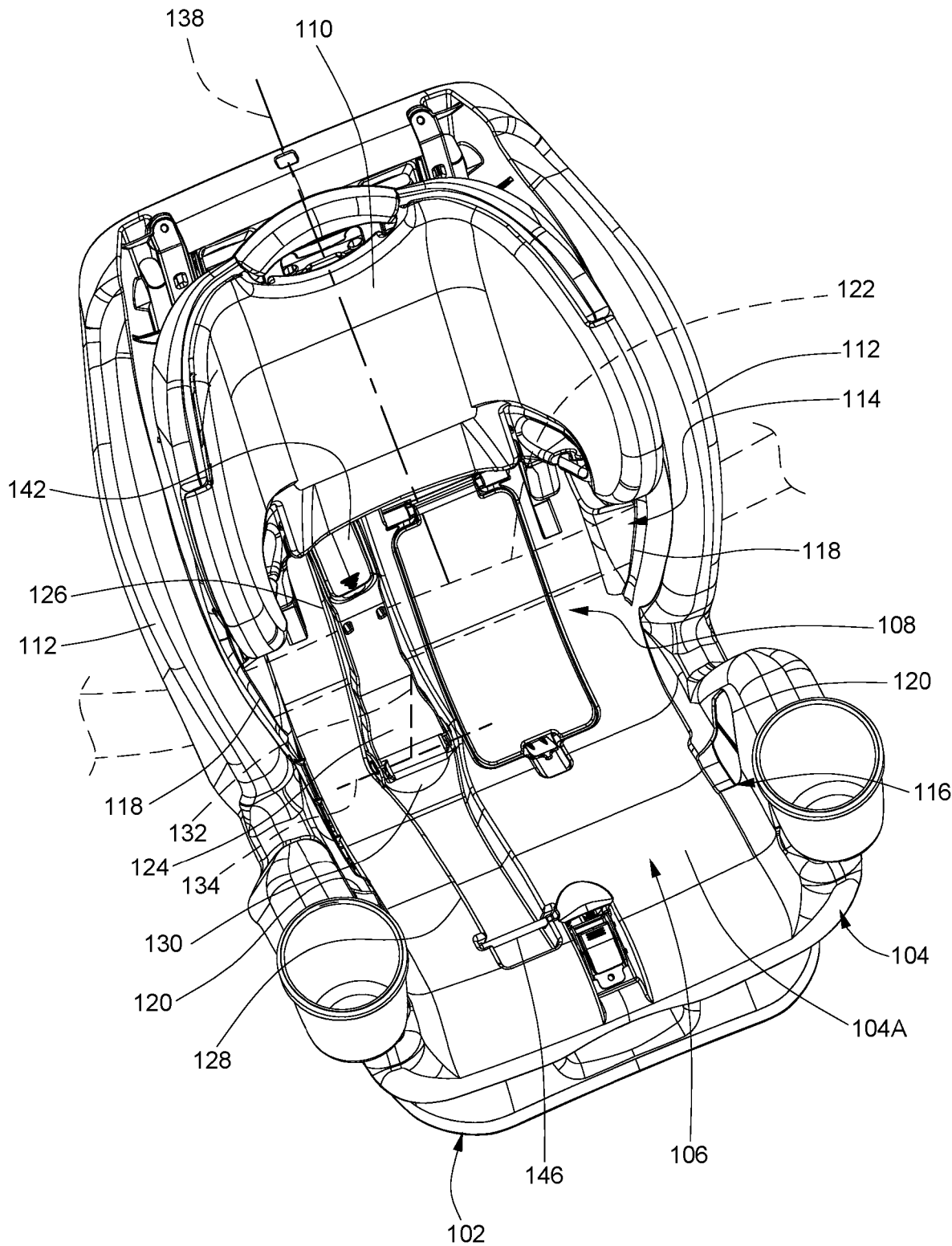
FIG. 1 is a perspective view illustrating an embodiment of a child safety seat having a belt tightener in a first position adapted to clamp an anchor belt disposed along a first belt path.

FIGS. 1-4 are perspective views illustrating an embodiment of a child safety seat 100. Referring to FIGS. 1-4, the child safety seat 100 can include a base 102, and a seat shell 104 assembled with the base 102. The base 102 can provide stable support for installation of the child safety seat 100 on a vehicle seat. The seat shell 104 is adapted to receive a child, and can include a seat portion 106, a backrest portion 108, and a headrest 110 that may be vertically adjusted along the backrest portion 108 to adapt to a child's size.

The seat shell 104 has a shell surface 104A that extends along the seat portion 106 and the backrest portion 108. The shell surface 104A can be sideways delimited between two sidewalls 112 that are respectively provided at a left and a right side of the seat shell 104 and can respectively extend along the left and the right side of the seat portion 106 and the backrest portion 108. The shell surface 104A and the two sidewalls 112 can at least partially delimit an inner region of the seat shell 104 for receiving a child.

Figure 2:
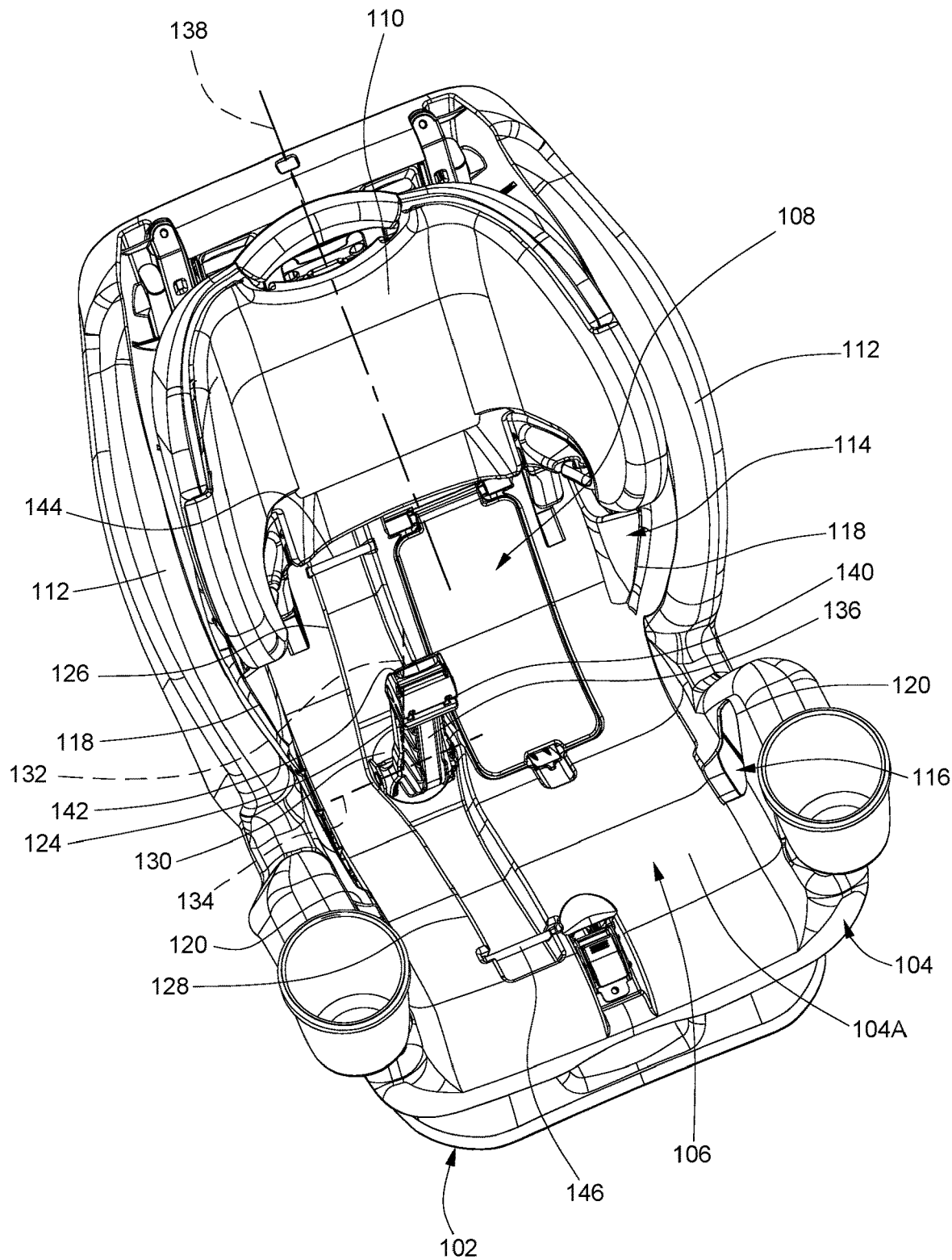
FIG. 2 is s a perspective view illustrating the child safety seat shown in FIG. 1 with the belt tightener in a release state.
Figure 3:
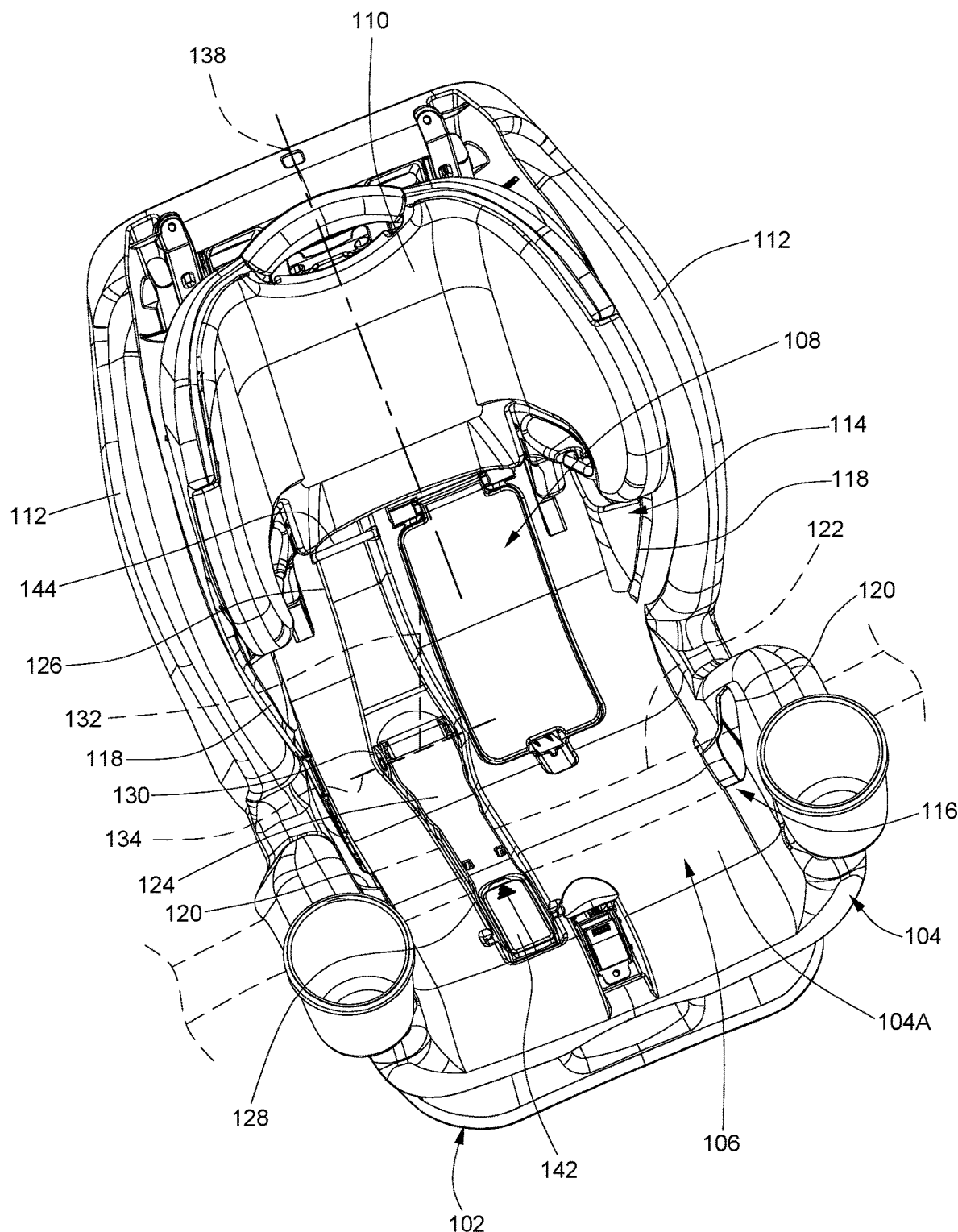
FIG. 3 is a perspective view illustrating the child safety seat shown in FIG. 1 with the belt tightener in a second position adapted to clamp an anchor belt disposed along a second belt path.
Figure 4:
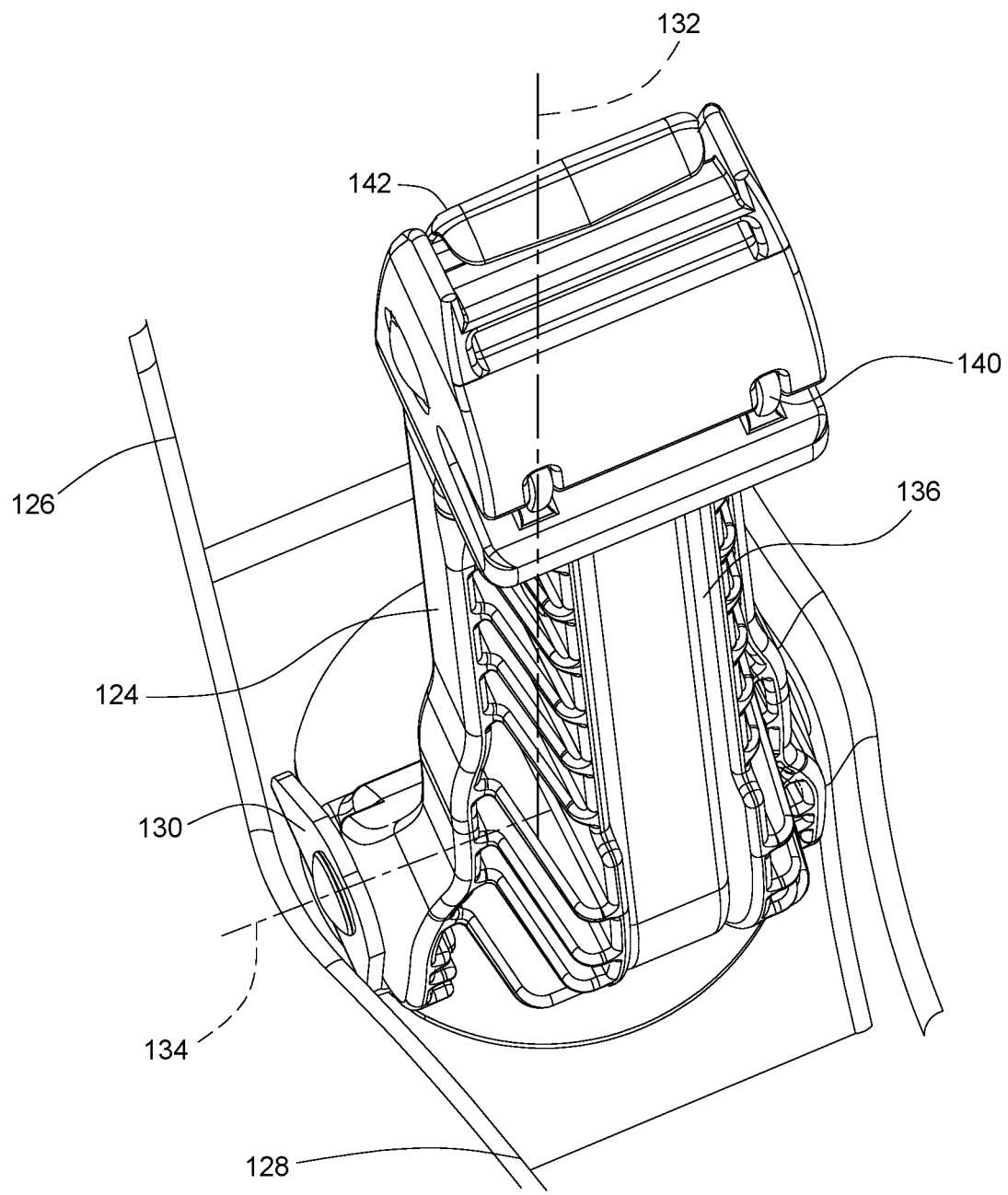
FIG. 4 is an enlarged view illustrating the belt tightener in the position shown in FIG. 2.

Referring to FIGS. 1-3, the seat shell 104 can define a first belt path 114 configured to receive an anchoring belt for attaching the child safety seat 100 in a forward facing position on a vehicle seat (i.e., the front of the seat shell 104 facing a front of the vehicle seat), and a second belt path 116 configured to receive an anchoring belt for attaching the child safety seat 100 in a rearward facing position on a vehicle seat (i.e., the front of the seat shell 104 facing a seatback of the vehicle seat). The first belt path 114 can include two openings 118 respectively provided symmetrically through the two sidewalls 112 in a region corresponding to the backrest portion 108, and the second belt path 116 can include two openings 120 respectively provided symmetrically through the two sidewalls 112 in a region corresponding to the seat portion 106 and in front of the two openings 118. An anchoring belt 122 may be routed along the first belt path 114 for attaching the child safety seat 100 in a forward facing position (shown with phantom lines in FIG. 1), and along the second belt path 116 for attaching the child safety seat 100 in a rearward facing position on a vehicle seat (shown with phantom lines in FIG. 3). The anchoring belt 122 can be a vehicle seatbelt, or a harness separately provided.

Referring to FIGS. 1-4, the child safety seat 100 can further include a belt tightener 124 operable to hold and tension the anchoring belt 122 for ensuring tight attachment of the child safety seat 100. According to an example of construction, the belt tightener 124 may be a part having an elongate shape. The belt tightener 124 can be pivotally connected with the seat shell 104, and is movable relative to the seat shell 104 for adjustment. FIGS. 1-3 illustrate the belt tightener 124 in different positions. The belt tightener 124 is adjustable between a first position shown in FIG. 1 where the belt tightener 124 can clamp and tighten an anchoring belt 122 disposed along the first belt path 114, and a second position shown in FIG. 3 where the belt tightener 124 can clamp and tighten an anchoring belt 122 disposed along the second belt path 116. More specifically, the seat shell 104 can have two distinct cavity portions 126 and 128 that are provided on the shell surface 104A respectively overlapping with the first belt path 114 and the second belt path 116, and the belt tightener 124 can respectively push and clamp an anchoring belt 122 in the cavity portion 126 in the first position and in the cavity portion 128 in the second position.

Referring to FIGS. 1-4, the belt tightener 124 can be connected with the seat shell 104 at a location between the two cavity portions 126 and 128. For example, the belt tightener 124 can be pivotally connected with the seat shell 104 via a rotary base 130 that is disposed between the two cavity portions 126 and 128. According to an example of construction, the rotary base 130 may be provided as a unitary part. The rotary base 130 can be pivotally connected with the seat shell 104 about a pivot axis 132, and the belt tightener 124 can be pivotally connected with the rotary base 130 about a pivot axis 134. The pivot axis 134 may be substantially orthogonal to the pivot axis 132. The rotary base 130 and the belt tightener 124 are rotatable together about the pivot axis 132 relative to the seat shell 104 to orient a pressing portion 136 (better shown in FIGS. 2 and 4) of the belt tightener 124 toward a front of the seat shell 104 or toward the backrest portion 108 of the seat shell 104 as desired. Moreover, the belt tightener 124 can pivot about the pivot axis 134 relative to the rotary base 130 and the seat shell 104 between a clamping state and a release state.

With the aforementioned construction, the belt tightener 124 can selectively closes the cavity portion 126 in the first position shown in FIG. 1 and the cavity portion 128 in the second position shown in FIG. 3. More specifically, when the belt tightener 124 is in the first position, the belt tightener 124 can extend toward a top of the seat shell 104, and the pressing portion 136 of the belt tightener 124 can be at least partially received in the cavity portion 126 and push therein an anchoring belt 122 that is routed along the belt path 114, which corresponds to a clamping state suitable for installation of the child safety seat 100 in a forward facing position. When the belt tightener 124 is in the second position, the belt tightener 124 can extend toward the front of the seat shell 104, and the pressing portion 136 of the belt tightener 124 can be at least partially received in the cavity portion 128 and push therein an anchoring belt 122 that is routed along the belt path 116, which corresponds to a clamping state suitable for installation of the child safety seat 100 in a rearward facing position.

According to an example of construction, the seat shell 104 can have a central axis 138 generally equidistant from the two sidewalls 112, and the two cavity portions 126 and 128 can be offset from the central axis 138 and disposed at a same side. Accordingly, the belt tightener 124 can be offset from the central axis 138 in the first and second positions. This can leave more room at a center of the seat shell 104 for placement of harness components such as a harness a-lock strap, a crotch buckle and the like.

Referring to FIGS. 1-4, a latching mechanism may be provided to lock the belt tightener 124 in the first and second positions. The latching mechanism can include a latch 140 (better shown in FIG. 4) provided on the belt tightener 124, and a release actuator 142 connected with the latch 140. The latch 140 can be pivotally connected with the belt tightener 124, and can project at an underside of the belt tightener 124. According to an example of construction, the latch 140 may have a hook shape. The release actuator 142 can be pivotally connected with the belt tightener 124, and can be disposed adjacent to a distal end of the belt tightener 124.

The seat shell 104 can be fixedly connected with two rods 144 and 146 that are respectively disposed in the two cavity portions 126 and 128. The latch 140 can engage with the rod 144 to lock the belt tightener 124 in the first position closing the cavity portion 126, and with the rod 146 to lock the belt tightener 124 in the second position closing the cavity portion 128. The release actuator 142 is operable to cause the latch 138 to disengage from the rod 144 or 146 for unlocking the belt tightener 124.

Figure 5:
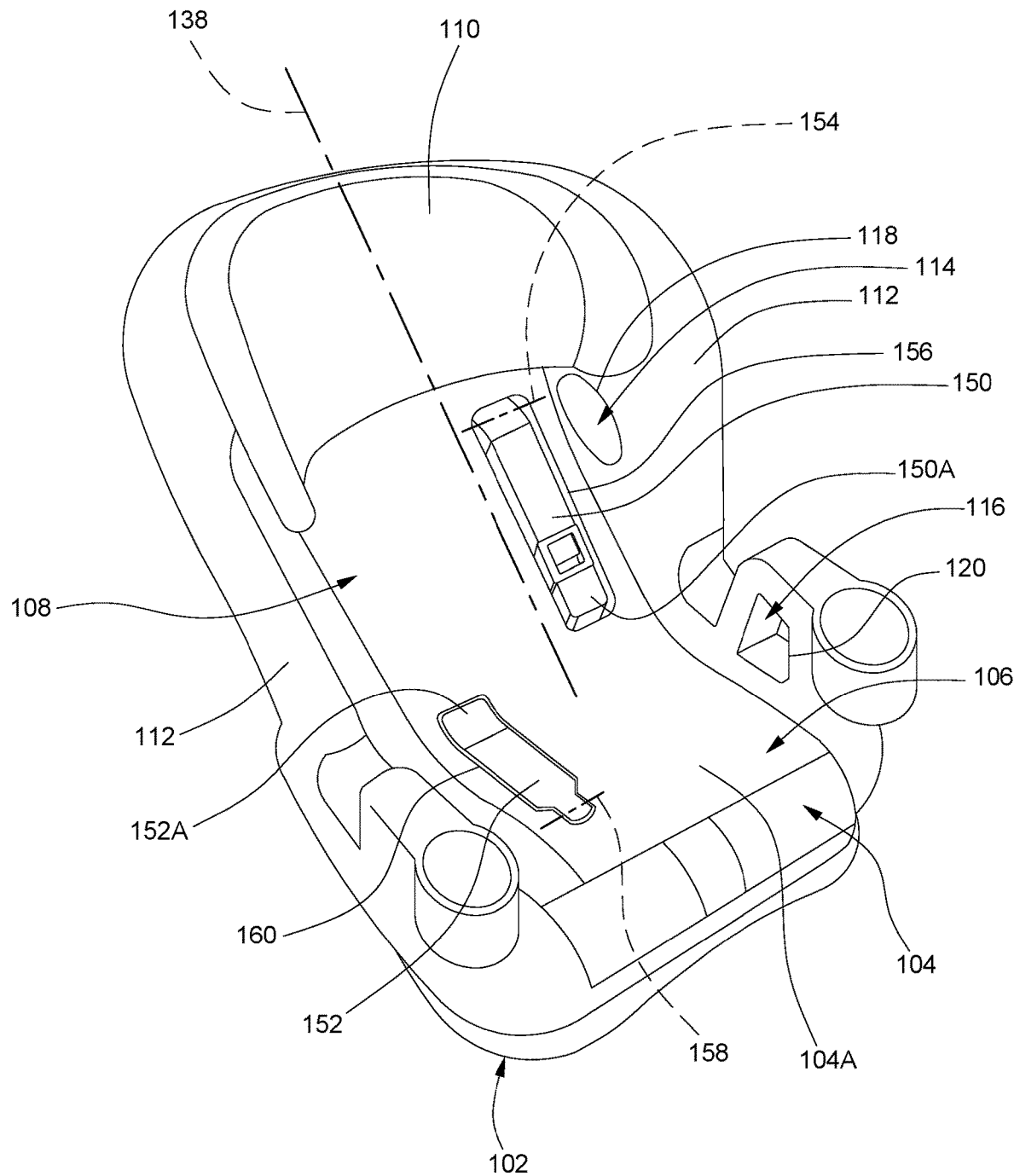
FIG. 5 is a perspective view illustrating a variant construction of the child safety seat including two belt tighteners.

FIG. 5 is a schematic perspective view illustrating a variant construction of the child safety seat 100. Referring to FIG. 5, the child safety seat 100 includes two separate belt tighteners 150 and 152, which substitute for the belt tightener 124 described previously. The two belt tighteners 150 and 152 can be disposed in an inner region of the seat shell 104 between the two sidewalls 112, and can be offset from the central axis 138 of the seat shell 104. This can leave more room at a center of the seat shell 104 for placement of harness components such as a harness A-lock strap, a crotch buckle and the like. The belt tightener 150 is operable to clamp and tighten an anchoring belt disposed along the belt path 114 for attaching the child safety seat 100 in a forward facing position on a vehicle seat, and the belt tightener 152 is operable to clamp and tighten an anchoring belt disposed along the belt path 116 for attaching the child safety seat 100 in a rearward facing position on a vehicle seat.

According to an example of construction, the belt tightener 150 can be pivotally connected with the seat shell 104 about a pivot axis 154, and can have a distal end 150A that is movable toward and away from the seat shell 104 when the belt tightener 150 pivots about the pivot axis 154 between a clamping state and a release state. When the belt tightener 150 is in the clamping state, the distal end 150A can be located below the pivot axis 154, and the belt tightener 150 can close a cavity portion 156 provided on the seat shell 104.

Likewise, the belt tightener 152 can be pivotally connected with the seat shell 104 about a pivot axis 158, and can have a distal end 152A that is movable toward and away from the seat shell 104 when the belt tightener 152 pivots about the pivot axis 158 between a clamping state and a release state. When the belt tightener 152 is in the clamping state, the distal end 152A can be located behind the pivot axis 158, and the belt tightener 152 can close a cavity portion 160 provided on the seat shell 104. The two cavity portions 156 and 160 can be disposed at two opposite sides of the central axis 138 with the cavity portion 156 positioned higher than the cavity portion 160.

Each of the two belt tighteners 150 and 152 can be respectively provided with a separate latch operable to lock it in the clamping state. FIGS. 6-8 are schematic views illustrating an exemplary construction of a latch 164 provided on the belt tightener 150. The latch 164 can be pivotally connected with the belt tightener 150, and can protrude at an underside of the belt tightener 150. The latch 164 can engage with a structure (e.g., a rod 166) that is fixedly connected with the seat shell 104 in the cavity portion 156 for locking the belt tightener 150 in the clamping state. Moreover, the latch 164 may be partially exposed on an upper side of the belt tightener 150 for operation. The other belt tightener 152 may be provided with a separate latch that is similar to the latch 164 in construction. FIG. 6 illustrates the latch 164 engaged with the rod 166 to lock the belt tightener 150 in the clamping state. FIG. 7 illustrates the latch 164 disengaged from the rod 166 to unlock the belt tightener 150. FIG. 8 illustrates the belt tightener 150 in a release state.

The child safety seats described herein include various constructions of belt tighteners that are easy to operate. The belt tighteners can provide proper tension in an anchoring belt for securely attaching a child safety seat on a vehicle seat in a forward or rearward facing configuration.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell adapted to receive a child, the seat shell defining a first and a second belt path, the first belt path being configured to receive an anchoring belt for attaching the child safety seat in a forward facing position on a vehicle seat, and the second belt path being configured to receive an anchoring belt for attaching the child safety seat in a rearward facing position on a vehicle seat;
   a belt tightener pivotally connected with the seat shell, the belt tightener being adjustable between a first position for clamping an anchoring belt disposed along the first belt path, and a second position for clamping an anchoring belt disposed along the second belt path, the belt tightener being movable as a single body between the first position and the second position; and
   a latching mechanism operable to lock the belt tightener in the first and second positions.

2. The child safety seat according to claim 1, wherein the belt tightener is connected with the seat shell via a rotary base, the rotary base being pivotally connected with the seat shell about a first pivot axis, and the belt tightener being pivotally connected with the rotary base about a second pivot axis, the rotary base and the belt tightener being rotatable about the first pivot axis relative to the seat shell to orient the belt tightener toward a front of the seat shell or toward a backrest portion of the seat shell, and the belt tightener being rotatable about the second pivot axis relative to the rotary base between a clamping state and a release state.

3. The child safety seat according to claim 1, wherein the seat shell has a first and a second cavity portion, and the belt tightener has a pressing portion adapted to push an anchoring belt in any of the first and second cavity portions, the pressing portion being at least partially received in the first cavity portion in the first position and in the second cavity portion in the second position.

4. The child safety seat according to claim 3, wherein the belt tightener is connected with the seat shell at a location between the first and second cavity portions.

5. The child safety seat according to claim 3, wherein the belt tightener selectively closes the first cavity portion in the first position and the second cavity portion in the second position.

6. The child safety seat according to claim 3, wherein the latching mechanism includes a latch provided on the belt tightener, and the seat shell is fixedly connected with a first and a second rod respectively disposed in the first and second cavity portion, the latch being respectively engaged with the first rod to lock the belt tightener in the first position and with the second rod to lock the belt tightener in the second position.

7. The child safety seat according to claim 6, wherein the latch is connected with a release actuator that is disposed adjacent to a distal end of the belt tightener, the release actuator being operable to cause the latch to disengage from the first or second rod for unlocking the belt tightener.

8. The child safety seat according to claim 1, wherein the seat shell has two sidewalls respectively located at a left and a right side of the seat shell and a central axis generally equidistant from the two sidewalls, and the belt tightener is offset from the central axis in the first and second positions.

9. A child safety seat comprising:
   a seat shell adapted to receive a child, the seat shell having a front, and a first and a second cavity portion distinct from each other;
   a belt tightener pivotally connected with the seat shell and having a pressing portion adapted to push an anchoring belt in any of the first and second cavity portions, the belt tightener having a first position where the pressing portion is at least partially received in the first cavity portion for clamping an anchoring belt disposed along a first belt path, and a second position where the pressing portion is at least partially received in the second cavity portion for clamping an anchoring belt disposed along a second belt path; and
   a latching mechanism operable to lock the belt tightener in the first and second positions;
   wherein the belt tightener is connected with the seat shell via a rotary base, the rotary base being pivotally connected with the seat shell about a first pivot axis, and the belt tightener being pivotally connected with the rotary base about a second pivot axis, the rotary base and the belt tightener being rotatable about the first pivot axis relative to the seat shell to orient the belt tightener toward the front of the seat shell or toward a backrest portion of the seat shell, and the belt tightener being rotatable about the second pivot axis relative to the rotary base between a clamping state and a release state.

10. The child safety seat according to claim 9, wherein the belt tightener extends toward a top of the seat shell in the first position, and extends toward the front of the seat shell in the second position.

11. The child safety seat according to claim 9, wherein the belt tightener is connected with the seat shell at a location between the first and second cavity portions.

12. The child safety seat according to claim 9, wherein the belt tightener selectively closes the first cavity portion in the first position and the second cavity portion in the second position.

13. The child safety seat according to claim 9, wherein the latching mechanism includes a latch provided on the belt tightener, and the seat shell is fixedly connected with a first and a second rod respectively disposed in the first and second cavity portion, the latch being respectively engaged with the first rod to lock the belt tightener in the first position and with the second rod to lock the belt tightener in the second position.

14. The child safety seat according to claim 13, wherein the latch is connected with a release actuator that is disposed adjacent to a distal end of the belt tightener, the release actuator being operable to cause the latch to disengage from the first or second rod for unlocking the belt tightener.

15. The child safety seat according to claim 9, wherein the seat shell has two sidewalls respectively located at a left and a right side of the seat shell and a central axis generally equidistant from the two sidewalls, and the belt tightener is offset from the central axis in the first and second positions.

16. The child safety seat according to claim 9, wherein the seat shell has two sidewalls respectively located at a left and a right side of the seat shell and a central axis generally equidistant from the two sidewalls, and the first and second cavity portions are offset from the central axis.

17. A child safety seat comprising:
a seat shell adapted to receive a child, the seat shell having a central axis and two sidewalls respectively located at a left and a right side of the seat shell, the central axis being generally equidistant from the two sidewalls; and
a first and a second belt tightener respectively connected pivotally with the seat shell, the first and second belt tighteners being disposed in an inner region of the seat shell between the two sidewalls and offset from the central axis, the first belt tightener being operable to tighten an anchoring belt disposed along a first belt path for attaching the child safety seat in a forward facing position on a vehicle seat, and the second belt tightener being operable to tighten an anchoring belt disposed along a second belt path for attaching the child safety seat in a rearward facing position on a vehicle seat.

18. The child safety seat according to claim 17, wherein the first and second belt tighteners are respectively connected pivotally with the seat shell about a first and a second pivot axis, and respectively have a first and a second distal end that are movable toward and away from the seat shell when the first and second belt tighteners are switched between a clamping state and a release state, the first distal end being located below the first pivot axis when the first belt tightener is in the clamping state, and the second distal end being located behind the second pivot axis when the second belt tightener is in the clamping state.

19. The child safety seat according to claim 18, wherein each of the first and second belt tighteners is respectively provided with a latch operable to lock the first or second belt tightener in the clamping state.

\* \* \* \* \*